United States Patent Office
3,370,817
Patented Feb. 27, 1968

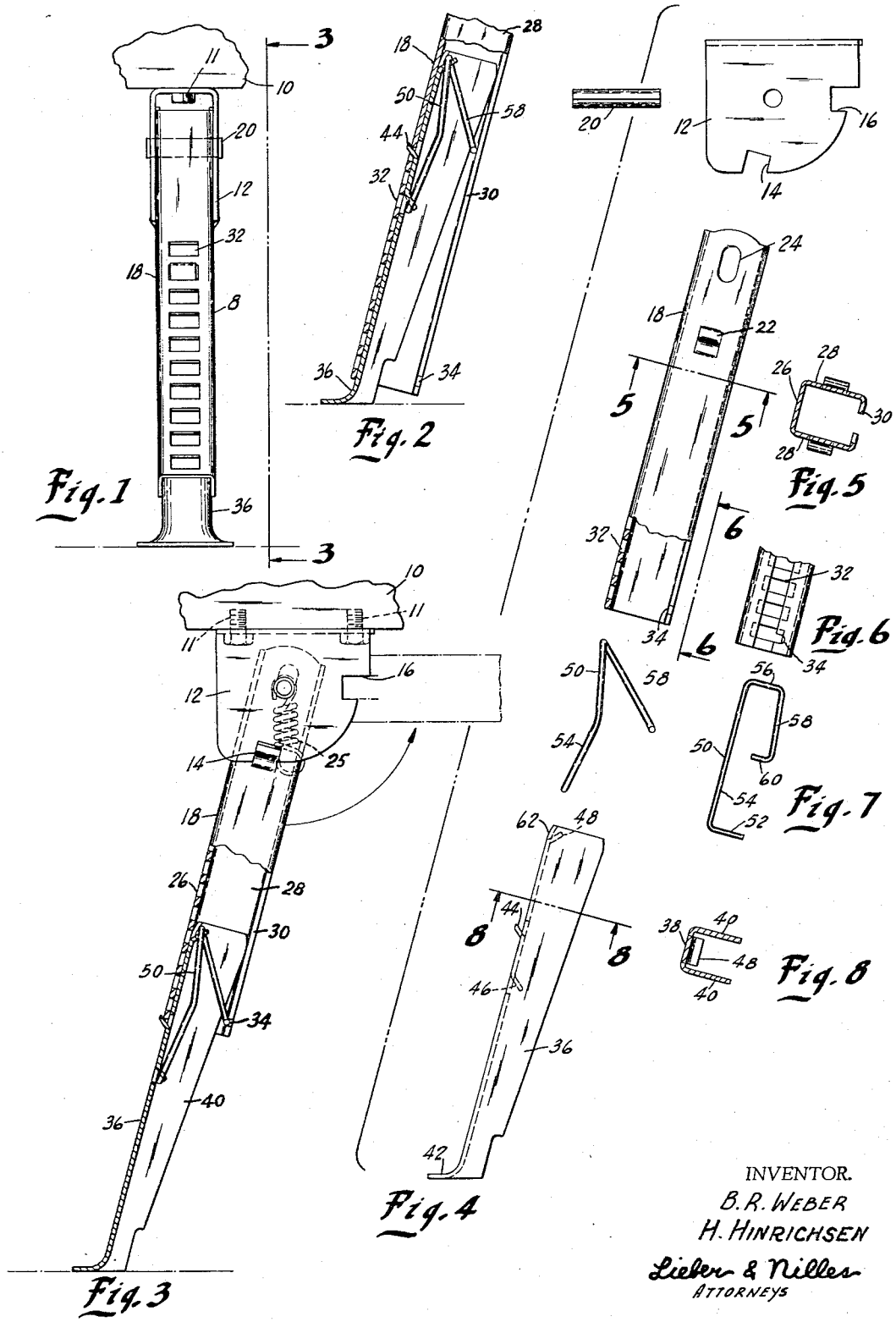

3,370,817
ADJUSTABLE TRAILER STABILIZER
Bernard R. Weber, Elm Grove, and Hans Hinrichsen, Wauwatosa, Wis., assignors to The Fulton Company, West Allis, Wis., a corporation of Wisconsin
Filed Nov. 1, 1965, Ser. No. 505,862
8 Claims. (Cl. 248—188.5)

ABSTRACT OF THE DISCLOSURE

A trailer stabilizer formed of telescopic leg members which may be easily and quickly adjusted to the desired height without the use of tools and which are automatically retained in adjusted condition by a spring cooperating with the telescopic leg members and normally, constantly urging the same into interlocked condition.

Background

When trailers, particularly of the two wheel or tandem camper type, are placed in their effective use, it is often desirable to provide some means for maintaining or stabilizing the trailer body in a level position. Such a stabilizing means usually consists of a downwardly extending prop or stand mounted on one or both ends of the trailer to support the same in a stabilized position when it is detached from the vehicle. Such a support not only enables the operator to stabilize the trailer and retain the same in a selected load supporting position, but in certain instances, it also facilitates the hitching and unhitching operations. Furthermore, by supporting the trailer tongue above the ground, the possibility of deterioration or damage to the hitch at the forward end of the trailer tongue is greatly minimized.

It is, of course, also desirable to provide a stabilizing device which is adaptable for use with varying types and sizes of trailers and which is moreover suitable for use under diverse conditions. Thus, to permit proper adjustment in order to compensate for such conditions as differences in trailer and/or wheel sizes, different desired load levels, uneven terrain or the like, the supporting leg of the stabilizer should preferably be rendered adjustable in length. Additionally, it is desirable to provide for retraction and removal of the supporting or stabilizing leg during hauling operations and over-the-road travel. Moreover, the operator should be able to effect all such adjustments quickly and effectively without need for special tools or the like, and one adjusted, the setting should be positive to avoid the possibility of accident.

While numerous trailer tongue stands or stabilizers have heretofore been proposed, these prior devices have not satisfactorily met all of the desired prerequisites. For example, U.S. Patent No. 3,020,063, dated Feb. 6, 1962 to Warren and U.S. Patent No. 3,146,002, dated Aug. 25, 1964 to Faber both show a typical type of trailer stabilizer which is adjustable. However, in such devices the length of the stabilizer is adjusted by loosening a nut or wingnut and removing a bolt or threaded pin. It can be readily appreciated that such a construction is difficult and time-consuming to manipulate, generally requiring a wrench or pliers to loosen the nut. Furthermore, there is always the possibility that the various parts of the stabilizer may accidently separate during adjustment, thereby requiring re-assembly before the stabilizer may be used. Also, the parts are susceptible to rust, thread stripping and deterioration as well as loss or misplacement.

Other prior constructions have proposed the use of spring loaded pins such as shown in U.S. Patents No. 918,062, dated Apr. 13, 1909 to King, No. 1,156,789, dated Oct. 12, 1915 to Lough, No. 2,711,183, dated June 21, 1955 to Lofstrand, and No. 3,013,772, dated Dec. 19, 1961 to Atherton et al. in adjustment mechanisms for changing the effective length of a supporting member. However, these devices also tend to be difficult to manipulate and are generally unsuited for use in trailer stabilizers since they may accidentally allow the parts of the stabilizer to separate. In addition to the relatively insecure holding ability of this type of adjustment mechanism, the parts are again subject to possible displacement, loss and deterioration.

Summary

It is, therefore, an object of the present invention to provide an improved adjustable length trailer stabilizer which obviates the aforesaid difficulties of prior devices of this general type.

A further object of this invention is to provide an improved trailer tongue stand or stabilizer which may be quickly and easily adjusted to a plurality of lengths by a novice without need for any tools whatsoever.

Still another object of this invention is to provide an improved trailer stabilizer having no external fittings or the like requiring manipulation in order to effect adjustments.

An additional object of this invention is to provide an adjustable trailer stabilizer, the parts of which cannot accidently become separated during adjustment.

Yet another object of this invention is to provide an adjustable length trailer stabilizer which may be simply and inexpensively constructed from sheet metal and which is moreover capable of substantially trouble-free operation and rough usage for long periods of time.

A further object of the present invention is to provide an improved adjustable trailer stabilizer which has no extending parts such as wingnuts, bolt heads, levers or the like which are apt to interfere with operation and adjustment by the operator and which includes telescoping upper and lower leg sections which are automatically and constantly urged to locked positions as selected by the operator.

In its preferred embodiment, the improved adjustable length trailer stabilizer comprises generally a hollow upper leg member having a plurality of spaced apertures in one wall thereof, a lower leg member slidably received within the upper leg member, the lower leg member having a lug selectively engageable in the apertures formed in the upper leg member to positively position the lower leg member relative to the upper member and means co-acting with both the upper and lower leg members to constantly resiliently urge the lug toward effective locking engagement with the apertures.

These and other objects and advantages of the present invention will become apparent from the following detailed description.

Drawings

The several features constituting the present improvement and the mode of operation and use of trailer stabilizers embodying the invention will be had by referring to the drawing accompanying and forming a part of this specification wherein like reference characters designate the same or similar parts in the various views.

FIGURE 1 is a front view of a typical adjustable trailer stabilizer embodying the present invention;

FIGURE 2 is a fragmentary partial cross-sectional view of the device taken in the direction of the arrows in FIGURE 1;

FIGURE 3 is another fragmentary part-sectional view of the adjustable trailer stabilizer of the present invention but showing the supporting leg adjusted to its fully extended position;

FIGURE 4 is an exploded view of the trailer stabilizer of the present invention;

FIGURE 5 is a cross-sectional view through the upper leg member taken along line 5—5 of FIGURE 4;

FIGURE 6 is a fragmentary rear view of the lower portion of the upper leg member taken in the direction of the arrows 6—6 of FIGURE 4;

FIGURE 7 is a rear view of the spring employed in the adjustable trailer stabilizer of the present invention; and FIGURE 8 is a transverse section through the lower leg member taken along the line 8—8 of FIGURE 4.

*Detailed description*

While the invention has been shown and described herein as emboided in a stabilizing leg especially adapted for attachment to a camper trailer or the like for the purpose of maintaining the floor thereof in level condition, and as embodying a pair of telescopic leg members of channel shape, it is not intended to thereby restrict or limit the scope of the invention to such specific use and/or construction, since the stabilizing leg may also be used to advantage as a trailer tongue stand or in supporting and stabilizing any overhanging portions of a trailer or for supporting any type of immobile structure in a predetermined position, and the supporting leg may be comprised of more than two sections of tubular stock. It is also contemplated that various descriptive terms used herein shall be given the broadest possible interpretation consistent with the disclosure.

Referring now to FIGURE 1, the numeral 8 indicates an adjustable stabilizer leg of the present invention. In normal use, the stabilizer 8 is fastened to the underside of a trailer 10 near any overhanging and otherwise unsupported portion thereof as by means of bolts 11 which extend through the mounting bracket 12. The bracket 12 is bifurcated to include a pair of parallel spaced depending side plates having aligned positioning notches 14 and 16 therein.

The stabilizer leg 8 is formed of an upper leg member 18 pivotally mounted in the bracket 12 between the depending plates thereof by means of a pin 20 or the like, the member 18 being retained in either its effective in use position or in its ineffective travel position by projections or lugs 22 which selectively engage notches 14 and 16. To mount the leg member 18 on the pivot pin 20 so as to permit the leg to be withdrawn from the notches 14, 16 and swung to a selected position, the member 18 is provided with aligned slots 24 adjacent its upper end for receiving the pin 20. Thus, the leg is permitted to be moved along the pin 20 a sufficient distance to allow projections 22 on member 18 to disengage from the slots 14 or 16 in order to swing the leg about pivot 20 to thereby change its position. A spring 25 stretched between the upper leg member 18 and the pin 20 retains the stabilizer 8 in the desired position as illustrated in FIGURE 3.

Upper leg member 18 is preferably formed of channel shape from sheet metal with a front wall 26, a pair of opposed side walls 28, and a rear wall 30. While the rear wall 30 may be solid, it is preferred to form this wall with a longitudinal slot extending the full length of upper leg member 18 so that the rear wall, in effect, constitutes a pair of inwardly directed flanges.

The front wall 26 of the member 18 is formed with a plurality of apertures 32 at longitudinally spaced intervals therealong. Such openings provide the increments of adjustability in the length of the telescopic leg 8 and may, for example, be placed at equally spaced locations along front wall 26. Wall 30 also contains a notch 34 in the lower portion thereof for purposes hereafter described.

Lower leg member 36 may also be formed from sheet metal and is designed to fit inside of member 18 and to be telescopically movable therein to alter the total length of the stabilizer 8. As such, the member 36 is channel shaped in cross section, having a front wall 38 and a pair of parallel side walls 40. The lower end of the lower leg member 36 is also designed to include a pad 42 at its lower end to support the same on the ground.

The front wall 38 of the lower leg member 36 is additionally formed with a lug 44 extending outwardly therefrom adapted to enter the openings 32 in the front wall 26 of the upper member 18 to lock the upper and lower leg members in selected positions of adjustment. Front wall 38 of lower member 36 also contains a pair of longitudinally spaced inwardly extending hooks or tabs 46, 48 which serve to mount a spring 50 in the manner shown in FIGURES 2 and 3 and described hereinafter in greater detail. The lower portions of side walls 40 may also be tapered toward front wall 38 to provide a convenient gripping portion for manipulation of the lower leg member 36 to effect desired adjustments.

The spring 50 is designed to lock the lower leg member 36 in adjusted position with respect to the upper leg member 18 by insuring that lug 44 is engaged in openings 30 except when the length of stabilizer 8 is being adjusted. As shown, the spring 50 is formed from a single piece of spring steel and has a lower transverse portion 52 corresponding approximately in length to the width of lower leg member 36; a longitudinal flexure portion 54 bowed outwardly between its ends; an upper transverse portion 56 similar in length to the portion 52; a leg portion 58 extending from an end of the portion 56 diagonally away from the portion 54; and a foot portion 60 extending transversely from the free end of the leg portion 58 toward the plane of the portion 54.

The spring 50 is mounted on the front wall of the lower leg member 36 by positioning the lower transverse portion 52 below the tab hook 46 with the upper transverse portion 56 positioned over the tab hook 48, the spring being retained on the tabs under spring tension by deflection of the bowed flexure portion 54. The spring leg portion 58 is deflected inwardly so as to enter the upper leg portion 18 under pressure and the foot 60 thereof thus bears against the rear wall 30 to constantly resiliently urge the lower leg member 36 toward and against the front wall 26 of the upper leg member. This causes the lug 44 to positively engage the selected opening 32 to retain the leg members 18, 36 in adjusted position. Also, when the weight of trailer 10 is applied to the stabilizer 8, the thrust generated thereby serves to additionally insure locking engagement of the lug 44 in the selected openings 32.

The length of stabilizer 8 is adjusted by moving lug 44 out of engagement with one of the openings 32 and into engagement with another selected opening. This is initiated by grasping the lower leg member 36 and swinging the same rearwardly away from the front wall 26 of the upper leg member 18 against the pressure of spring 50. This removes the lug 44 from the opening 32 and permits telescopic adjustment of the device, and the upper edge 62 of the front wall 38 which acts as the fulcrum may be rounded slightly as shown to aid the adjustment operation. The taper of the rear edges of the side walls 40 of the lower leg member 36 should be of such magnitude as to allow the member 36 to be swung a sufficient distance to insure removal of the lug 44 from the opening 32 within which it has been confined. Side walls 40 also provide a stop against excessive pivoting of the lower member 36. When the desired length has been attained by the telescopic adjustment as described, the lower leg member need merely be released to allow spring 50 to automatically resiliently urge the member 36 toward the front wall 26, thereby causing the lug 44 to engage the desired opening 32 and thus relock the stabilizer leg in adjusted position.

It is thus apparent that the transverse portions 52, 56 of the spring 50 are retained under tension within the tab hooks 46, 48 respectively by the interconnecting spring portion 54. Also, the leg 58 which is compressed within the upper leg member 18 cooperates with the portion 54 of the spring to constantly urge the lower leg member 36 toward the front wall 26 of the upper leg member with adjustments being effected merely by swinging the lower leg member about its fulcrum 62 and sliding the same to its selected adjustment position. The transverse foot 60 not only provides a bearing for permitting the spring to slide along the rear wall 30, but this foot portion 60 also coacts with the notch 34 formed in the lower end of the rear wall 30 of the upper leg member 18 to insure against accidental removal of the lower leg member 36 from the upper leg member 18. As shown in FIGURE 3, the transverse foot 60 of the spring will be forced into the notch 34 under pressure when the lower leg member 36 has been extended to its fullest extent, thus providing an effective stop which prevents further extension of the leg. If and when it is desired to dismantle the leg and remove the lower leg member 36 from the upper leg member 18, it is only necessary to exert pressure on the engaged locking foot portion 60 of the spring through the notch 34, and the lower leg member 36 is then permitted to slide freely from the lower end of the upper leg member 18 in an obvious manner.

From the foregoing, it is apparent that the present invention provides an adjustable stabilizer for trailers or the like which is capable of being easily and quickly manipulated to the desired length by a novice and without tools. Further, the stabilizer involves no external protruding fittings or loose parts and is designed so that the various parts thereof cannot accidentally become separated. The improved device may moreover be fabricated of sheet metal at relatively low cost, and is of rugged and safe construction. The unique spring 50 is also protectively housed and serves not only as an effective lock for retaining the telescopic leg members in adjusted positions but also provides a stop for preventing accidental separation thereof during adjustment.

While the present embodiment is considered preferred, it is appreciated that numerous modifications may be made without departing from the invention. For example, although the telescopic leg has been shown and described as being disposed at a particular angle to the load in its supporting position, it would also be effective at other angles such as one of 90° relative to the load. Also, the upper leg member 18 could be formed of tubing rather than being of generally channel shape, and the spring 50 could conceivably be of a leaf or coil design.

Various modes of carrying out the invention are contemplated as being within the scope of the following claims particularly pointing out and distinctly claiming the subject matter which is regarded as the invention:

We claim:
1. An adjustable load supporting leg comprising, a hollow upper leg member provided with a plurality of adjustment apertures in a first wall thereof, means at one end of said upper leg member for securing the same to the load to be supported, a lower leg member slidably received within the other end of said upper leg member and having a lug formed in a wall thereof for selective engagement within the wall apertures of said upper leg member to lock the members in selected position of adjustment, said lower leg member being swingable away from said first wall of said upper leg member a sufficient distance to disengage said lug, and a spring mounted on the wall of said lower leg member and having a spring loaded leg extending therefrom, the free end of said spring loaded leg slidably bearing on a second wall of said upper leg member to constantly resiliently urge said lower leg member and the lug thereof toward said first wall of said upper leg member, and means on said second wall for arresting sliding movement of said spring-loaded leg therealong to thereby prevent accidental separation of said upper and lower leg members.

2. An adjustable load supporting leg according to claim 1, wherein the free end of the spring loaded leg is formed with a transverse foot and the second wall of the upper leg member is formed with a notch near the end thereof for receiving the foot and preventing accidental separation of the upper and lower leg members when they reach the extent of their adjustments.

3. An adjustable load supporting leg according to claim 1, wherein the wall of the lower leg member is provided with a pair of spaced oppositely directed hooks and the spring is formed with a pair of spaced transverse portions joined by a bowed portion, said transverse portions being received by said hooks with the bowed portion maintained under tension to mount the spring on the wall of the lower leg member.

4. An adjustable load supporting leg according to claim 1, wherein the means for securing the upper leg member to the load to be supported is a bracket to which the upper leg member is pivotally attached for swinging movement to and from load supporting position and means is also provided for selectively positively retaining said leg member in either its load supporting or inactive position.

5. An adjustable load supporting leg according to claim 1, wherein the lower leg member is channel-shaped and the opposite side walls are tapered inwardly toward the intermediate wall at the outer free end of said member to permit said member to be swung sufficiently relative to the upper leg member to disengage the lug.

6. An adjustable load supporting leg according to claim 5, wherein the outer free end of the lower leg member terminates in a flared ground engaging foot.

7. An adjustable load supporting leg according to claim 1, wherein the end of the lower leg member which is confined within the upper leg member is curved inwardly away from the first wall of the upper leg member to provide a fulcrum for said lower leg member while permitting sliding movement thereof within said upper leg member.

8. An adjustable load supporting leg according to claim 1, wherein both the upper and lower leg members are channel shaped and the side walls of the upper leg member are formed with opposed inwardly directed flanges cooperating with the first wall for confining the lower leg member and the spring.

References Cited

UNITED STATES PATENTS

| | | | |
|---|---|---|---|
| 900,025 | 4/1911 | Willour | 248—352 |
| 1,820,592 | 8/1931 | Bauer | 108—125 |
| 1,979,568 | 11/1934 | O'Connor et al. | 108—125 |
| Re. 23,097 | 4/1949 | Imes | 248—188.5 X |
| 2,591,999 | 4/1952 | Barham | 248—188.5 |

ROY D. FRAZIER, *Primary Examiner.*

FRANK DOMOTOR, *Assistant Examiner.*